United States Patent
Baird et al.

(10) Patent No.: US 8,412,683 B2
(45) Date of Patent: Apr. 2, 2013

(54) SYSTEMS AND METHODS FOR IDENTIFICATION AND REPORTING OF AD DELIVERY HIERARCHY

(75) Inventors: James Baird, Seattle, WA (US); Nick Redmond, Edmonds, WA (US); Gregory Harrison, Seattle, WA (US); Brian Gebala, Seattle, WA (US); John Kawamoto, Seattle, WA (US)

(73) Assignee: Comscore, Inc., Reston, VA (US)

( * ) Notice: Subject to any disclaimer, the term of this patent is extended or adjusted under 35 U.S.C. 154(b) by 71 days.

(21) Appl. No.: 12/963,365

(22) Filed: Dec. 8, 2010

(65) Prior Publication Data
US 2011/0137925 A1 Jun. 9, 2011

Related U.S. Application Data

(60) Provisional application No. 61/267,742, filed on Dec. 8, 2009, provisional application No. 61/267,748, filed on Dec. 8, 2009, provisional application No. 61/267,751, filed on Dec. 8, 2009.

(51) Int. Cl.
*G06F 7/00* (2006.01)

(52) U.S. Cl. ...................................... 707/688

(58) Field of Classification Search ................ 707/688
See application file for complete search history.

(56) References Cited

U.S. PATENT DOCUMENTS

| | | | | |
|---|---|---|---|---|
| 2003/0005430 A1* | 1/2003 | Kolessar | | 725/9 |
| 2005/0097008 A1* | 5/2005 | Ehring et al. | | 705/26 |

* cited by examiner

*Primary Examiner* — Truong Vo
(74) *Attorney, Agent, or Firm* — MH2 Technology Law Group, LLP

(57) ABSTRACT

Systems and methods for determining delivery hierarchical information for an Ad unit. In an example method performed at a server, location information is received from a user computer system via a network. The location information is associated with an Ad unit presented on a webpage accessed by the user computer system. The server determines if any previously stored signature information matches with at least a portion of the received location information, then extracts domain information for any portions of the received location information that matches with any previously stored signature information. Then, at least partial delivery hierarchical information is generated based on the extracted domain information. The process repeats for other location information associated with the Ad unit that is received at the server. The generated delivery hierarchical information is aggregated. Then a report is generated based on the aggregated delivery hierarchical information.

15 Claims, 4 Drawing Sheets

*1. Delivery Hierarchy*

All → Exchange Network B → Ad Network A → Ad Network B

Only show entries having [Impressions of at least: ▼] [    ] [Go]

| Domain | Impressions △ | View | InView | Clicks | CTR | Engd | Ave Engd | Uniques |
|---|---|---|---|---|---|---|---|---|
| audaciousadvertising.com | 129,725 | 128,565 | 99%★ | 0 | 0% | 0% | 0:00 | 3,254 |
| integrityinternetadvertising.com | 123,344 | 122,081 | 99%★ | 0 | 0% | 0% | 0:03 | 3,055 |
| competitivecontent.com | 120,001 | 118,809 | 99%★ | 0 | 0% | 0% | 0:00 | 3,019 |
| hazardadvertising.com | 97,980 | 97,076 | 99%★ | 0 | 0% | 0% | 0:00 | 531 |
| stalwartmediagroup.com | 97,794 | 96,893 | 99%★ | 0 | 0% | 0% | 0:00 | 543 |
| thecarsonnetwork.com | 97,390 | 96,427 | 99%★ | 0 | 0% | 0% | 0:00 | 532 |
| globaladforce.com | 97,359 | 96,380 | 99%★ | 0 | 0% | 0% | 0:00 | 497 |

*Domain or "Last Hop" Sites/Networks*

*FIG.3*

| EventCode | Event | uid | swfname | eventcode | location | wh | xy | vchannel | cid | publisher | pageurl | duration | extended elements |
|---|---|---|---|---|---|---|---|---|---|---|---|---|---|
| 000_000_1 | AdImpression | X | X | X | X | X | X | X | X | X | X | | X |
| 000_000_2 | InitialInView | X | X | X | X | X | X | X | X | X | X | | |
| 000_000_3 | OutOfView | X | X | X | X | X | X | X | X | X | X | X | |
| 000_000_4 | CloseUnload | X | X | X | X | X | X | X | X | X | X | X | |
| 000_000_5 | InitialMouseEnter | X | X | X | X | | | X | X | X | X | | |
| 000_000_6 | MouseHover | X | X | X | X | | | X | X | X | X | X | |
| 000_000_7 | MouseClick | X | X | X | X | | X | X | X | X | X | X | |
| 000_000_8 | MouseExit | X | X | X | X | | X | X | X | X | X | X | |
| 000_000_9 | InView | X | X | X | X | X | X | X | X | X | X | | |
| 000_000_10 | MouseEnter | X | X | X | X | | X | X | X | X | X | | |

*FIG. 4*

SYSTEMS AND METHODS FOR IDENTIFICATION AND REPORTING OF AD DELIVERY HIERARCHY

PRIORITY CLAIM

This application claims the benefit of U.S. Provisional Application Ser. Nos. 61/267,742, 61/267,748, 61/267,751 filed Dec. 8, 2009, which are hereby incorporated by reference.

BACKGROUND OF THE INVENTION

Present web-based ad identification and reporting solutions are not adequate at understanding ad placements on publisher sites and how placement affects revenue yield and delivery cost. Also, these solutions fail to identify the sources of good and bad traffic in the case where one is trafficking via third-party ad networks and publisher networks.

A key issue with network trafficking (i.e. buying ad impressions via third-party ad networks and publisher networks) is that summary-level totals on Impressions, Clicks, Click-through Rate (CTR), and Total Unique Visitors (Uniques) are typically provided. These third-parties do not provide "drill-down" capability to view the internal makeup of the aggregated traffic volume. Therein lies an inherent problem, which is a lack of transparency. With this lack of transparency comes an opportunity on the part of the trafficker to introduce fraudulent or otherwise under-performing traffic volume to the effort.

SUMMARY

The present invention provides systems and methods for determining delivery hierarchical information for an Ad unit. In an example method performed at a server, location information is received from a user computer system via a network. The location information is associated with an Ad unit presented on a webpage accessed by the user computer system. The server determines if any previously stored signature information matches with at least a portion of the received location information, then extracts ad network and domain information for any portions of the received location information that matches with any previously stored signature information. Then, at least partial delivery hierarchical information is generated based on the extracted ad network and domain information.

In one aspect of the invention, first and last participants (ad networks and/or domains) in the delivery hierarchy are identified.

In another aspect of the invention, the process repeats for other location information associated with the Ad unit that is received at the server. The generated delivery hierarchical information is aggregated. Then a report is generated based on the aggregated delivery hierarchical information.

In still another aspect of the invention, the server determines if the extracted domain information requires decoding based on decoding information associated with the signature information and decodes the extracted domain information if it was determined that the extracted domain information requires decoding.

BRIEF DESCRIPTION OF THE DRAWINGS

Preferred and alternative examples of the present invention are described in detail below with reference to the following drawings:

FIG. 3 illustrates an example report generated in accordance with an embodiment of the present invention; and FIG. 4 is a graph of events and associated data elements.

DETAILED DESCRIPTION OF THE PREFERRED EMBODIMENT

Figure 1:
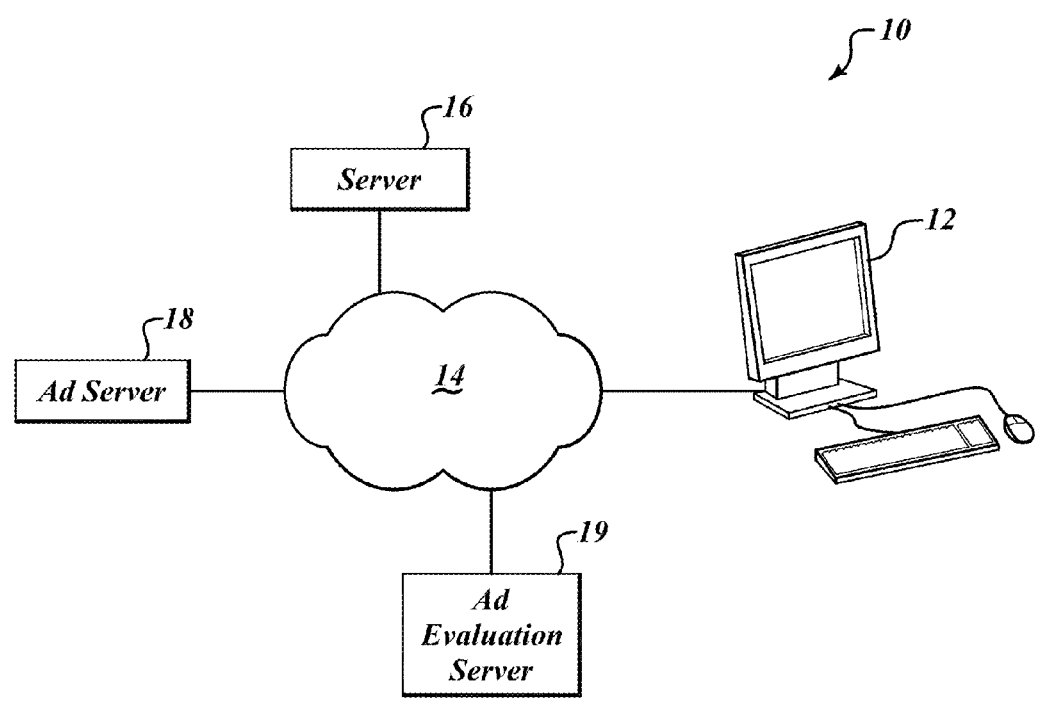
FIG. 1 illustrates a system configured to implement the present invention.

FIG. 1 illustrates an example system 10 that captures and reports metrics regarding Ad delivery. The system 10 includes one or more user computer systems 12 coupled to multiple servers 16-19 over a public or private data network (e.g., the Internet) 14. A website generating server 16 produces a website that is accessible by a user via a browser on one of the user computer systems 12 over the network 14. The website includes Ad tags that instruct the browser to retrieve a corresponding advertisement (Ad unit) from an associated Ad server 18 over the network 14. The website, Ad tag or retrieved advertisement includes embedded code that determines a number of metrics associated with display of the advertisement. The determined metrics are then sent to an Ad evaluation server 19 and/or the other servers 16, 18 for evaluation.

The present invention provides the ability to instrument ads with the ability to understand delivery hierarchy (DH). This method specifically avoids the pitfalls of "Beaconing/Pixeling" and post-ad-impression URL "spidering", which is subject to the limitations of what is contained by the "referrer" element of browser ad delivery. Instead, the present invention extracts all pertinent delivery data in real-time, as the ad is being delivered.

Many methods are implemented on behalf of the ad/publisher networks to obfuscate the trafficking information regarding what domains were trafficked, in what impression volume, and at what level of performance. This includes, but is not limited to the prolific use of (unnecessary) iFrames and explicit rewriting of the URL request referrer information.

The present invention extracts critical information pertinent to ad delivery, combined with a specific method of evaluating the extracted information to derive DH data.

Figure 2:
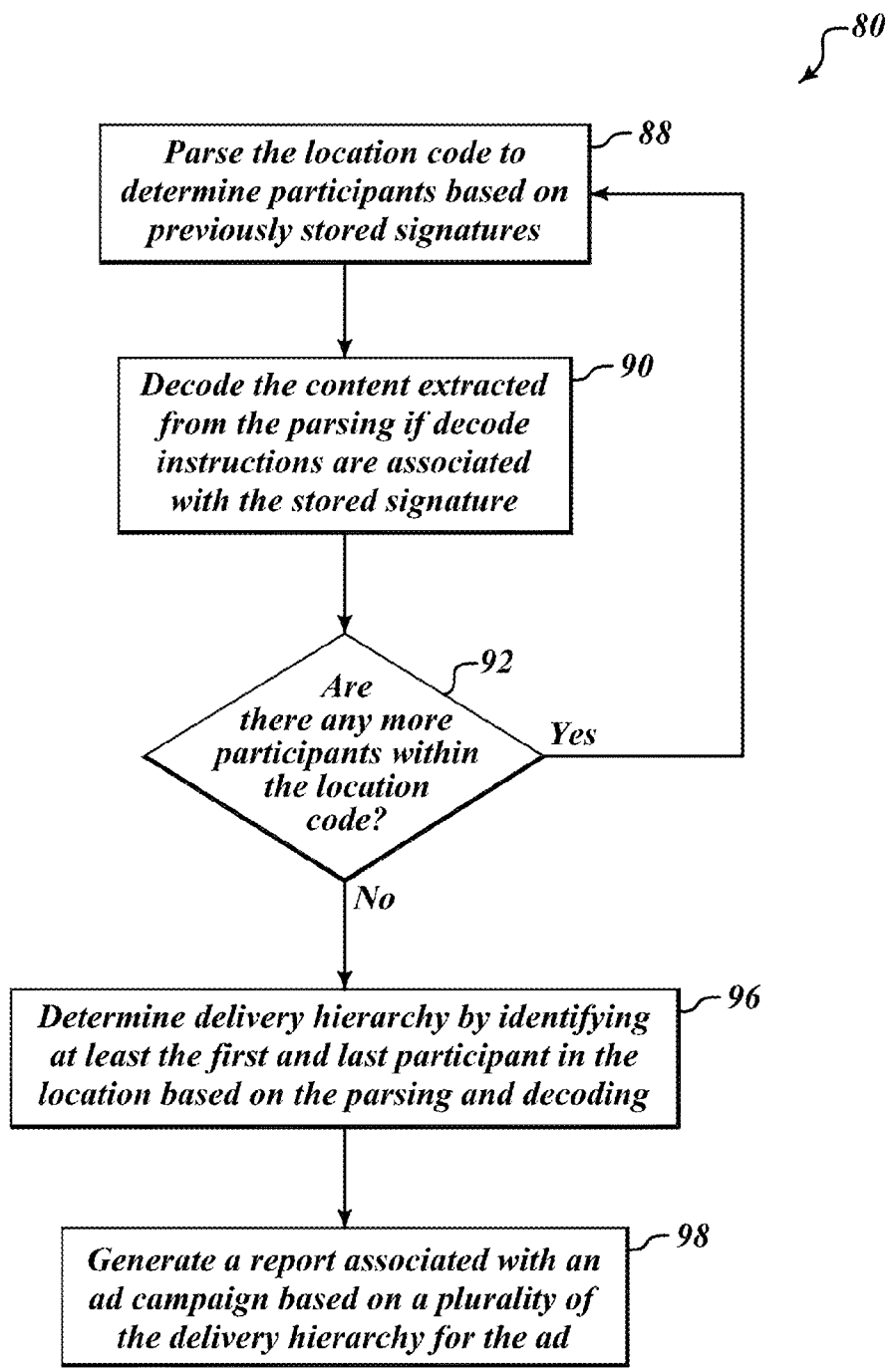
FIG. 2 is a flowchart of an example process performed by one or more of the servers shown in FIG. 1.

FIG. 2 shows a flow diagram of an example process 80 performed by one of the servers 16-19. First, at a block 88, location code associated with an Ad unit is received at one of the servers 16-19 and then is parsed to determine participants (i.e., publishers, ad servers) involved in the transportation of the Ad unit to the user computer system 12. The parsing is based on previously stored signatures that are associated with the participants. Next, at a block 90, decoding of the parsed content is performed if decode instructions were associated with the stored signature. At a decision block 92, the process 80 continues until all signatures have been analyzed (i.e., are there any other valid participants in the location code). After all the signatures have been analyzed, at least the first and last participants are identified thereby determining delivery hierarchy—see block 96. At a block 98, a report is generated for the Ad unit. An example report is shown in FIG. 3. The process 80 is described in more detail below by example.

The extraction of the DH data is achieved by virtue of (a) DH data being present in the ad code being rendered on the browser page and (b) a real-time evaluation of ad placement and ad code and referrer content maintained/reported by the browser.

The present invention provides a proprietary (e.g., Javascript) code that is delivered with an Ad unit. This code essentially "listens" to the browser for specific event types, such as scrolling events, render events, close events, etc. In one embodiment, the present invention uses an open source library (e.g., jQuery) to "connect" to the browser on the user computer system 12. This allows the system 12 to receive these browser events and then use custom (e.g., Javascript) code to identify the location of the Ad unit(s) within the page and thus deduce when the independent browser events are applicable to the Ad unit and to the ad delivery information pertinent to DH data.

The browser events are reported back to the server(s) 16-19 for every ad impression delivered to a publisher site page and stored in event logs. The reported browser events are later processed via a Map/Reduce process to convert the raw data into a reporting database format—see FIG. 3. The DH data is added to the AdImpression event.

For every event (including the AdImpression event), at least a portion of the following elements are reported to the server(s) 16-19 as parameter values:

uid: The UIDToken representing the unique identifier for this specific Ad Container in the reporting database;

swfname: The name of the creative (ex: wbtw_728×90) (* see below for custom creative use-cases);

eventcode: The event code identifying the specific event being logged;

location: The page URL where the ad placement resides. See below regarding URLTypes and Parsing;

wh: The width and height of the browser viewport;

xy: The coordinates of the widget within the viewport or the mouse coordinates, depending on placement or creative eventcode type;

cid: CampaignID—An optional arbitrary value that is forwarded from a "cid" param passed to the ad code as a parameter value;

vchannel: ChannelID—An optional arbitrary value that is forwarded from a "vchannel" param passed to the ad code as a parameter value;

publisher: Publisher Identifier—An optional value that identifies the partner network, and is forwarded from a "publisher" param passed to the ad code as a parameter value;

pageurl: PageURL—An optional value to explicitly specify the hosting page, and is forwarded from a "pageurl" param passed to the ad code as a parameter value;

duration: A value, in milliseconds, measuring a time interval for the event type; and t: a unique value to validate the event.

The publisher and pageurl parameters are intended to be populated through the use of third-party ad network "macros", which substitute a pre-defined keyword string with an applicable runtime value. For example, the Yahoo! Right Media Exchange (RMX) macros for publisher and pageurl are ${PUBLISHERID} and ${SOURCEURLENC}, respectively.

The "location" event parameter is the field containing the data most pertinent to DH. The location field can include one or more URLs, depending on whether or not the originating page is in an iframe and whether the (Javascript) code is able to determine a delivery chain through evaluation of data object model (DOM) elements.

If the originating page is not in an iframe, the value of the Browser's HTTP Referrer header is stored as a basis for the location, and then the page DOM is further evaluated.

If the page is in an iframe, both the value of the Javascript document.referrer property (a javascript coding reference to the web page DOM elements) and the value of the HTTP Referrer header are stored as a basis for the location, and then the page DOM is further evaluated.

In either of the above two cases, URL information regarding additional ad-servers involved in the chain of delivery into the location field is additionally identified and included. The following is an example walkthrough of an evaluation of the DOM:

1. determine the location of the ad tag in the page based on the associated method defined by "Methods for capturing and reporting Metrics Regarding Ad Placement" as described in copending U.S. patent application Ser. No. 12/963,323 which is hereby incorporated by reference.

2. iterate through that ad tag's one or more containing DOM elements, looking for DOM elements that appear to be involved in ad delivery (primarily script and iFrame tags);

3. If the DOM element involved in URL generation is determined (by virtue of it's proximity and dependencies with the Ad Container), any relevant URLs are extracted (usually the "src" attribute of a script tag) and marked to be passed back to the server for concatenation onto the location field and eventual server-side analysis; and 4. repeat this process until DOM elements are reached that were not involved in ad delivery.

The combined DH data is concatenated as a single string value into the location parameter to the AdImpression and other pertinent events as defined by FIG. 4. This location data is then processed through a signature analysis process to extract the actual named network(s)/publisher(s)/domain(s) ad delivery hierarchy.

The DH location data is captured within the browser and reported to the server(s) 16-19 at the time of ad rendering. The server(s) 16-19 performs a Map/Reduce framework process that includes a process to evaluate the DH "location" data against a list of known "network signatures" and their respective domain-extraction instructions. Essentially, the server(s) 16-19 retains a list of all known location "signatures" and their respective syntax in such a way that, through the use of a Regular Expression (Regex), can be evaluated for pertinent DH data, including the originator of the ad request, any intermediary ad servers, and if present, the domain and page URL information.

A signature entry includes at least a portion of the following:

ID: A unique identifier for this signature;

Publisher: The "friendly name" of the associated ad/publisher network identified by this signature entry;

Match_URL: A regular expression defining a string match for this specific ad/publisher network signature;

Extract_PageURL: A regular expression defining a string match for this specific ad/publisher network signature that includes the specific location within the string to extract relevant domain and/or serving entity information;

Decode_Extract: A Numeric value indicating whether the value identified by the extract_pageurl: regular expression output requires decoding and what specific decoding (ex: Binary, Base64, Hexadecimal, etc.); and PriorityIndex: A numeric value used to order the signature entries to provide a basis for prioritized ordering of the signature analysis.

An example of a typical signature entry is identified below

```
id: 2
publisher (participant): RightMedia (RMX)
match_url: "http://ad\d*\.yieldmanager.com/st?.*=,,http://.*
extract_pageurl: http://ad\d*\.yieldmanager.com/st?.*=,,(http://.*)
JDOVersion: 1
decode_extract: 0
PriorityIndex: 0
```

Signatures are typically present for every ad network and ad server. As such, there are many hundreds of such signatures, and multiple signatures can exist for the same ad network/server. In this signature example, one of the multiple RightMedia ad network server signatures is represented. A Regular Expression defines an entry starting with a domain reference to yieldmanager.com with variable domain prefix values and evaluating the "location" data for the subsequent presence of a specific sequence of characters ("=,,http://"). If this string expression matches a location value, an extract_pageurl expression is used to identify a string value present in the location as identified by the parenthesis in the regular expression syntax.

As such, the following location value would match to the bolded elements.

```
location=http://ad.yieldmanager.com/st?D6RQAB2vBwBLVxw
AqDYJAAIAiAAAAA0AAgABBAIAAgMSRgwAJJ8EABw1DQAAAA
AAAAAAAAAAAAAAAAAAAAAAAAAAAAAAAAAAAA....BM8phz8A
AAAAAAAAAP..f9mBTZM.AAAAAAAAAAD....IS5ObPwAAAAAA
AAAAAAAAAAAAAAAAAAAAAAAAAAAAAAAAAAAAAAAAHCrW
smco8wXNQuxkA0UgZvHES4h9N.sbpXC2VAAAAAA=,,http://
www.mangafox.com/page/manga/read/5054/koutetsu_no_daitenshi/
chapter.71065/page.16/
```

And extract the bolded elements as the string value returned by the extract_pageurl expression.

```
location=http://ad.yieldmanager.com/st?D6RQAB2vBwBLVxw
AqDYJAAIAiAAAAA0AAgABBAIAAgMSRgwAJJ8EABw1DQAAAA
AAAAAAAAAAAAAAAAAAAAAAAAAAAAAAAAAAAA....BM8phz8A
AAAAAAAAAP..f9mBTZM.AAAAAAAAAAD....IS5ObPwAAAAAA
AAAAAAAAAAAAAAAAAAAAAAAAAAAAAAAAAAAAAAAAHCrW
smco8wXNQuxkA0UgZvHES4h9N.sbpXC2VAAAAAA=,,http://
www.mangafox.com/page/manga/read/5054/koutetsu_no_daitenshi/
chapter.71065/page.16/
```

In other cases, intermediate ad servers are identified by the location data, which are also identified and persisted in the reporting data.

```
http://ad.globalinteractive.com/st?ad_type=iframe&ad_size=
468x60§ion=43658http://ad.yieldmanager.com/iframe3?AAAAAGW
pBgAaRSoAAAAAAA03DAAAAAAAgAIAAQAAAAAAP8AAAA
HDSP-CAAAAAAAt.gDAAAAAAAdThEAAAAAAAAAAAAAAA
AAAAAAAAAAAAAAAAAAAAAAAAAAAAAAAAAAAAAAAAAAA
AABKnQMAAAAAAAIAAwAAAAAAAAAAAAAAAAAAACspIR7
PwAAAAAAAAAAAAArKSEiz8AAAAAAAAAAAAAAKykhJs.AA
AAAAAAAAAAAAAAAAAAAAAAAAAAAAAAAAAAAAAAABV
O0zogGD0BkWrqc.DA0hRbUwFeaesZPpfzqZLAAAAAA==,,http://
www.pdaapps.org/symbian-os-9-4-s60v5-apps-and-games/13847-
garmin-mobile-xt-ver-5-00-30-for-nokia-5800-a.html?hl=no
```

All such signatures have corresponding entries in the signature database and extract the pertinent information relating to the entities most directly responsible for ad delivery. In many cases, specifically where there are multiple ad/publisher networks and exchanges involved in the delivery chain, multiple matches can occur, in which case further analysis is performed to identify the entity most directly responsible for ad delivery ("first hop and last hop" analysis). First hop is determined based on the first element match against the signature database. The last hop is identified from the DOM elements as the Ad Container data immediately containing the actual ad banner.

Ultimately, these signature matches are matched to their "friendly names" as defined within the signatures database, such that the reporting server can reflect these friendly names as the basis for "drill-down" capability within the server, an example of which is shown in FIG. 3, which depicts ad impressions Server via an Exchange, which is passed to Network A, which is passed to Network B, and ultimately served to a Domain or "last hop" reference.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for determining delivery hierarchical information for an Ad unit, the method comprising:
    at a server
        receiving, from a user computer system via a network, location information associated with delivering the Ad unit presented on a webpage accessed by the user computer system, the location information comprising at least URL information associated with the Ad unit,
        determining if at least one of a previously stored plurality of signature information matches with at least a portion of the received location information, wherein each of the plurality of signature information is associated with a single entity and with a first and a second regular expression specific to that entity, and wherein determining comprises applying the first regular expression associated with at least one of the plurality of signature information to at least the URL information,
        identifying domain information associated with the received location information that matches with at least one of the previously stored plurality of signature information, wherein identifying comprises applying the second regular expression associated with the at least one of the plurality of signature information to at least the URL information,
        extracting the identified domain information from the received location information that matches with at least one of the previously stored signature information, wherein extracting comprises extracting the identified domain information from the URL information, and
        generating at least partial delivery hierarchical information based on the extracted domain information.

2. The method of claim 1, wherein generating comprises identifying which of the extracted domain information is a first domain in delivery hierarchy.

3. The method of claim 2, wherein generating comprises identifying which of the extracted domain information is a last domain in delivery hierarchy.

4. The method of claim 1, further comprising:
performing the determining, the identifying, the extracting, and the generating for a plurality of received location information for the Ad unit;
aggregating generated delivery hierarchical information; and
generating a report based on the aggregated delivery hierarchical information.

5. The method of claim 1, wherein extracting comprises:
determining if the extracted domain information requires decoding based on decoding information associated with the signature information; and
decoding the extracted domain information if it was determined that the extracted domain information requires decoding.

6. A server device coupled to a network for determining delivery hierarchical information for an Ad unit, the device comprising:
a communication component configured to receive location information from a user computer system via the network, wherein the location information is associated with delivering the Ad unit presented on a webpage accessed by the user computer system and the location information comprises at least URL information associated with the Ad unit;
a processor coupled to the communication component, the processor configured to:
determine if at least one of a previously stored plurality of signature information matches with at least a portion of the received location information, wherein each of the plurality of signature information is associated with a single entity and with a first and a second regular expression specific to that entity, and wherein determining comprises applying the first regular expression associated with at least one of the plurality of signature information to at least the URL information;
identify domain information associated with the received location information that matches with at least one of the previously stored plurality of signature information, wherein identifying comprises applying the second regular expression associated with the at least one of the plurality of signature information to at least the URL information;
extract the identified domain information from the received location information that matches with any at least one of the previously stored signature information, wherein extracting comprises extracting the identified domain information from the URL information; and
generate at least partial delivery hierarchical information based on the extracted domain information.

7. The device of claim 6, wherein the processor identifies which of the extracted domain information is a first domain in delivery hierarchy.

8. The device of claim 7, wherein the processor identifies which of the extracted domain information is a last domain in delivery hierarchy.

9. The device of claim 6, wherein the communication component receives a plurality of location information for the Ad unit,
wherein the processor is further configured to:
perform the determining, the identifying, the extracting, and the generating for the plurality of received location information for the Ad unit;
aggregate generated delivery hierarchical information; and
generate a report based on the aggregated delivery hierarchical information.

10. The device of claim 6, wherein the processor is further configured to:
determine if the extracted domain information requires decoding based on decoding information associated with the signature information; and
decode the extracted domain information if it was determined that the extracted domain information requires decoding.

11. A system for determining delivery hierarchical information for an Ad unit, the system comprising:
a means for receiving, from a user computer system via a network, location information associated with delivering the Ad unit presented on a webpage accessed by the user computer system, the location information comprising at least URL information associated with the Ad unit;
a means for determining if at least one of a previously stored plurality of signature information matches with at least a portion of the received location information, wherein each of the plurality of signature information is associated with a single entity and with a first and a second regular expression specific to that entity, and wherein determining comprises applying the first regular expression associated with at least one of the plurality of signature information to at least the URL information;
a means for identifying domain information associated with the received location information that matches with at least one of the previously stored plurality of signature information, wherein identifying comprises applying the second regular expression associated with the at least one of the plurality of signature information to at least the URL information,
a means for extracting the identified domain information from the received location information that matches with at least one of the previously stored signature information, wherein extracting comprises extracting the identified domain information from the URL information; and
a means for generating at least partial delivery hierarchical information based on the extracted domain information.

12. The system of claim 11, wherein the means for generating comprises a means for identifying which of the extracted domain information is a first domain in delivery hierarchy.

13. The system of claim 12, wherein the means for generating comprises a means for identifying which of the extracted domain information is a last domain in delivery hierarchy.

14. The system of claim 11, wherein the means for receiving, the means for determining, the means for identifying, the means for abstracting, and the means for generating operate on a plurality of received location information for the Ad unit; and further comprising:
a means for aggregating generated delivery hierarchical information; and
a means for generating a report based on the aggregated delivery hierarchical information.

15. The system of claim 11, wherein the means for extracting comprises:
a means for determining if the extracted domain information requires decoding based on decoding information associated with the signature information; and
a means for decoding the extracted domain information if it was determined that the extracted domain information requires decoding.

* * * * *